United States Patent
Horley

(10) Patent No.: US 11,275,670 B2
(45) Date of Patent: Mar. 15, 2022

(54) TRACING BRANCH INSTRUCTIONS

(71) Applicant: Arm Limited, Cambridge (GB)

(72) Inventor: John Michael Horley, Hauxton (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/970,771

(22) PCT Filed: Mar. 5, 2019

(86) PCT No.: PCT/GB2019/050606
§ 371 (c)(1),
(2) Date: Aug. 18, 2020

(87) PCT Pub. No.: WO2019/175540
PCT Pub. Date: Sep. 19, 2019

(65) Prior Publication Data
US 2020/0371891 A1 Nov. 26, 2020

(30) Foreign Application Priority Data

Mar. 13, 2018 (GB) ............................... GB1803991.7

(51) Int. Cl.
*G06F 11/00* (2006.01)
*G06F 11/34* (2006.01)
(Continued)

(52) U.S. Cl.
CPC ........ *G06F 11/348* (2013.01); *G06F 9/30058* (2013.01); *G06F 9/321* (2013.01);
(Continued)

(58) Field of Classification Search
CPC ............... G06F 11/348; G06F 11/3636; G06F 11/3476; G06F 2201/81; G06F 11/0754; G06F 11/076
See application file for complete search history.

(56) References Cited

U.S. PATENT DOCUMENTS

| 2012/0005463 A1* | 1/2012 | Mestan ............... | G06F 11/3476 712/240 |
| 2015/0006868 A1* | 1/2015 | Wagner ............... | G06F 11/3466 712/239 |
| 2016/0378636 A1* | 12/2016 | Strong ................ | G06F 11/3466 714/45 |

FOREIGN PATENT DOCUMENTS

GB         2551574          12/2017

OTHER PUBLICATIONS

International Search Report and Written Opinion of the ISA for PCT/GB2019/050606, dated May 23, 2019, 14 pages.
(Continued)

*Primary Examiner* — Charles Ehne
(74) *Attorney, Agent, or Firm* — Nixon & Vanderhye P.C.

(57) ABSTRACT

An apparatus comprises data processing circuitry to perform data processing operations in response to a sequence of instructions, where the sequence of instructions comprises branch instructions. Trace generating circuitry generates a trace stream of trace items indicative of the data processing operations. The trace generating circuitry is responsive to one or more not-taken branch instructions followed by a taken branch instruction in the sequence of instructions to: include at least one not-taken trace item corresponding to the one or more not-taken branch instructions followed by a taken trace item in the trace stream when a current status condition of the apparatus is met, and to include a source address associated with the taken branch instruction in the trace stream when the current status condition of the apparatus is not met. A hybrid approach between tracing not-taken branch instructions and tracing a source address associated with the taken branch instruction is thus provided.

17 Claims, 8 Drawing Sheets

(51) Int. Cl.
*G06F 9/30* (2018.01)
*G06F 9/32* (2018.01)
*G06F 11/07* (2006.01)
*G06F 11/36* (2006.01)

(52) U.S. Cl.
CPC ........ *G06F 11/076* (2013.01); *G06F 11/0721* (2013.01); *G06F 11/3636* (2013.01); *G06F 2201/88* (2013.01)

(56) References Cited

OTHER PUBLICATIONS

Combined Search and Examination Report for GB1803991.7, dated Sep. 14, 2018, 6 pages.

\* cited by examiner

INSTRUCTION SEQUENCE
(BRANCHES ONLY)

TRACE STREAM

B (TAKEN)                E

BNE                      N

BNE                      N

BEQ (TAKEN)              E

BNE

BNE

BNE

BNE

BEQ (TAKEN)              SOURCE ADDRESS

FIG. 5A loop:

1 CMP

2 BNE      N

3 BNE      N

4 BEQ      E
   ↓

1 CMP

4 BEQ      SOURCE ADDRESS
           E

1 CMP

2 ADD

3 BNE

4 SUB

5 BEQ  SOURCE  SOURCE
       ADDRESS ADDRESS
               E

FIG. 5C

TRACING BRANCH INSTRUCTIONS

This application is the U.S. national phase of International Application No. PCT/GB2019/050606 filed 5 Mar. 2019, which designated the U.S. and claims priority to GB Application No. 1803991.7 filed 13 Mar. 2018, the entire contents of each of which are hereby incorporated by reference.

TECHNICAL FIELD

The present disclosure relates to data processing. More particularly it relates to tracing branch instructions.

BACKGROUND

A data processing system may be provided with the capability to trace the operations carried out by a data processor of the system. This typically comprises the generation of a trace stream of trace items, which are indicative of those data processing operations. This trace stream is generated within the data processing system (e.g. within a system-on-chip) and needs to be exported from the system, so that the operations of the data processing system can be monitored. However the bandwidth which can be reserved (for example via a dedicated trace output pin) for this purpose is usually very constrained, and strict selection of the trace items to add to the trace stream and efficient representation of those selected trace items is therefore necessary. Many of the operations carried out by a data processor need not explicitly be traced, since where the data processor often executes a sequence of instructions, when a first instruction in that sequence is executed, it can be inferred that the instructions which sequentially follow were also executed. Branch instructions however need more explicit tracing, since whether or not a branch is taken typically depends on a runtime condition and thus, to be able to reconstruct what the processor did, knowledge is required of whether the branch was taken or not and hence which instructions were executed after the branch instruction.

SUMMARY

In at least one example embodiment there is an apparatus comprising:
data processing circuitry to perform data processing operations in response to a sequence of instructions, wherein the sequence of instructions comprises branch instructions; and
trace generating circuitry to generate a trace stream of trace items indicative of the data processing operations,
wherein the trace generating circuitry is responsive to one or more not-taken branch instructions followed by a taken branch instruction in the sequence of instructions to:
include at least one not-taken trace item corresponding to the one or more not-taken branch instructions followed by a taken trace item in the trace stream when a current status condition of the apparatus is met; and
to include a source address associated with the taken branch instruction in the trace stream when the current status condition of the apparatus is not met.

In at least one example embodiment there is a method of operating an apparatus comprising:
performing data processing operations in response to a sequence of instructions, wherein the sequence of instructions comprises branch instructions;
generating a trace stream of trace items indicative of the data processing operations,
wherein when one or more not-taken branch instructions are followed by a taken branch instruction in the sequence of instructions the generating a trace stream of trace items indicative of the data processing operations comprises:
including at least one not-taken trace item corresponding to the one or more not-taken branch instructions followed by a taken trace item in the trace stream when a current status condition of the apparatus is met; and
including a source address associated with the taken branch instruction in the trace stream a current status condition of the apparatus when the current status condition of the apparatus is not met.

In at least one example embodiment there is an apparatus comprising:
means for performing data processing operations in response to a sequence of instructions, wherein the sequence of instructions comprises branch instructions;
means for generating a trace stream of trace items indicative of the data processing operations,
wherein when one or more not-taken branch instructions are followed by a taken branch instruction in the sequence of instructions the means for generating activates:
means for including at least one not-taken trace item corresponding to the one or more not-taken branch instructions followed by a taken trace item in the trace stream when a current status condition of the apparatus is met; and
means for including a source address associated with the taken branch instruction in the trace stream when the current status condition of the apparatus is not met.

BRIEF DESCRIPTION OF THE DRAWINGS

The present techniques will be described further, by way of example only, with reference to embodiments thereof as illustrated in the accompanying drawings, in which:

FIGS. 5A, 5B, and 5C show example instructions sequences comprising branch instructions and corresponding resulting trace streams in one example embodiment;

DESCRIPTION OF EMBODIMENTS

Figure 1:
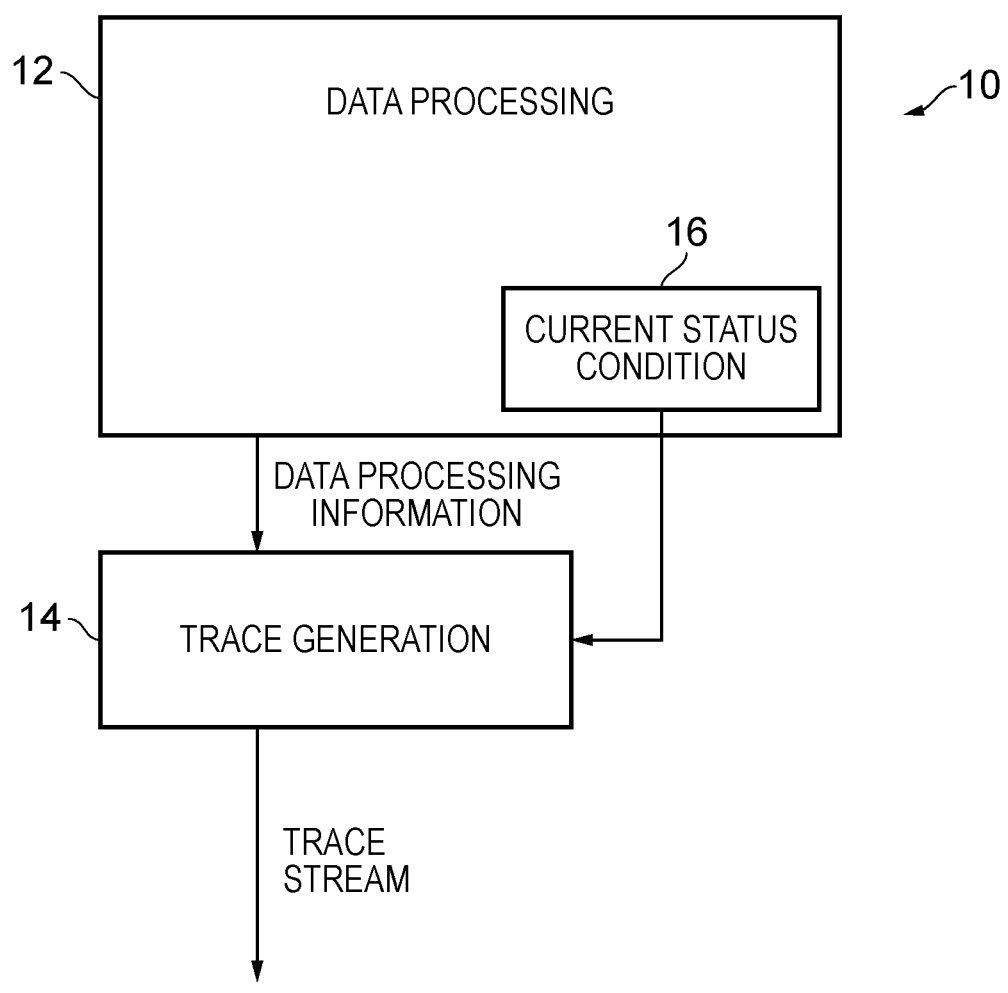
FIG. 1 schematically illustrates an apparatus in one example embodiment.

At least some embodiments provide an apparatus comprising:
data processing circuitry to perform data processing operations in response to a sequence of instructions, wherein the sequence of instructions comprises branch instructions; and
trace generating circuitry to generate a trace stream of trace items indicative of the data processing operations, wherein the trace generating circuitry is responsive to one or more not-taken branch instructions followed by a taken branch instruction in the sequence of instructions to:

include at least one not-taken trace item corresponding to the one or more not-taken branch instructions followed by a taken trace item in the trace stream when a current status condition of the apparatus is met; and to include a source address associated with the taken branch instruction in the trace stream when the current status condition of the apparatus is not met.

One approach to the tracing of branch instructions would be to output an indicator (i.e. a trace item) for every branch. For example, such an indicator could be encoded to either indicate that the branch was taken or non-taken. The efficiency with which arbitrary sequences of such of taken/not-taken indicators can be encoded allows for a trace stream which is similarly efficient in this regard. However, this approach requires knowledge of all branches, i.e. both those that are taken and those that are not-taken. Moreover, in contemporary processor architectures such "not-taken" execution is being optimised away, and merely preserving it for the sake of trace purposes is becoming more costly. Another approach to the tracing of branch instructions would be only to output an indicator (i.e. a trace item) in connection with a taken branch, but in order for the program flow to be reconstructed this requires knowledge of which specific branches were taken. The source addresses of the taken branches could be output to provide this knowledge, yet outputting such source addresses is notably less efficient (in terms of encoding efficiency) than the above mentioned encoded arbitrary sequences of taken/not-taken indicators.

In this context the present techniques propose a hybrid approach according to which the trace generating circuitry monitors a current status condition of the apparatus to determine how it responds to one or more not-taken branch instructions followed by a taken branch instruction. When the current status condition is met, the trace generating circuitry includes at least one not-taken trace item corresponding to the one or more not-taken branch instructions followed by a taken trace item in the trace stream. Conversely, when the current status condition of the apparatus is not met the trace generating circuitry includes a source address associated with the taken branch instruction in the trace stream. In other words the trace generating circuitry can switch between the two above-described approaches to tracing branches, i.e. under some circumstances to generate at least some not-taken trace items and under other circumstances to generate an explicit taken trace item comprising a source address associated with the taken branch instruction. Moreover, the apparatus is provided with the configurability to control when the trace generating circuitry switches between these two approaches, depending on the definition of the current status condition.

The current status condition may take a variety of forms, and could be defined according to any relevant criterion or criteria. However in embodiments the current status condition comprises a multiplicity of the one or more not-taken branch instructions. In other words the current status condition can depend on how many not-taken branch instructions are followed by the taken branch instruction in the sequence of instructions. Briefly, the more not-taken branch instructions that are encountered in sequence, the greater a size of the trace item or items which is/are required to represent those not-taken branch instructions when they are being explicitly traced. Moreover, although tracing a source address for a taken branch instruction requires a relatively large trace item in order to represent that source address, the present techniques recognise that this burden is relative and the more not-taken branch instructions which are explicitly traced as an alternative, the less burdensome this tracing of the taken branch instruction source address becomes.

Accordingly, in some embodiments the current status condition of the apparatus is the multiplicity being less than a threshold value. Thus by setting a threshold value the transition between the two approaches can be controlled, such that when the multiplicity (the number) of not-taken branch instructions is below the threshold the current status condition is met and the not-taken branch instructions are traced. Conversely when the multiplicity (the number) of not-taken branch instructions is at or above the threshold the current status condition is not met and instead a source address associated with the taken branch instruction is included in the trace stream. The setting of the threshold value is implementation dependent and depends on the particular requirements of the apparatus and the context in which it is operating. Indeed the ability to freely set this threshold value is a feature of the present techniques.

Monitoring the number of not-taken branch instructions may be implemented by any technically feasible mechanism, but in embodiments the apparatus further comprises a not-taken counter responsive to a not-taken branch instruction to increment. Reference may then be made to the value currently indicated by this counter to determine whether the current status condition is met, i.e. whether the value is below or at/above the threshold value.

The not-taken counter may take a variety of forms, but in embodiments the not-taken counter is a saturating counter arranged to saturate at the threshold value. Where the counter is used to determine the current status condition, and when the current status condition of the apparatus is determined as being met when the multiplicity is less than a threshold value, once the multiplicity reaches the threshold value the current status condition would not be affected by further increments of the counter and therefore a saturating counter reflects this.

The capacity of the not-taken counter is also implementation dependent and in some embodiments the not-taken counter comprises a one-bit storage element. In other embodiments the not-taken counter comprises a multiple-bit storage element.

In some embodiments the tracing trace generating circuitry is responsive to the taken branch instruction in the sequence of instructions to include as many not-taken trace items in the trace stream as the not-taken counter indicates when the current status condition of the apparatus is met.

The tracing trace generating circuitry may be responsive to occurrence of an exception in the data processing circuitry to include in the trace stream an exception trace item indicative of a point in the sequence of instructions at which the exception occurred and to reset the not-taken counter.

The tracing trace generating circuitry may be responsive to occurrence of an exception in the data processing circuitry to include as many not-taken trace items in the trace stream as the not-taken counter indicates.

The threshold value may also be variously configured, depending on the system requirements. In some embodiments the threshold value is a predetermined static value for the apparatus. In other embodiments the threshold value is a variable value.

The ability to vary the threshold value may find applicability in a range of circumstances. For example in some embodiments the trace generating circuitry is responsive to a current resource usage indication for the apparatus to dynamically set the threshold value. Such a current resource usage indication may take a variety of forms, and in particular may reflect the usage of a resource of the apparatus which may need to be traded off against the additional burden which must be borne by the apparatus when the threshold is set at a higher value. For example in embodiments the current resource usage indication for the apparatus indicates current occupancy of a storage element in the apparatus. Where storage capability within the apparatus may be a relatively scarce resource, it may be beneficial to reduce the threshold value (and thus reduce the capacity required to record the number of not-taken branch instructions which have been encountered) when the usage of the storage element is currently high.

The taken trace item which is generated may take a variety of forms. In some embodiments the taken trace item is an indication that a branch for the taken branch instruction was taken. This may for example be a simple "taken" indication, sometimes referred to as an "E atom" ("executed" atom). In some embodiments the taken trace item is the source address associated with the branch instruction. In other words the source address itself may be used as the indication that the branch was taken. In some embodiments the taken trace item is an indication that a branch for the taken branch instruction was taken preceded by the source address associated with the branch instruction. In other words both the source address and, for example, the above-mentioned simple "taken" indication ("E atom") may be used.

The branch instructions may be direct or indirect. In some embodiments the taken trace item further comprises an indication of a target address for the branch, when the branch is an indirect branch.

A contemporary may take steps to improve performance by removing instructions from the execution sequence which (based on recent experience) are rarely executed. For example at least some "not-taken" branches may be dealt with in this way. In this context the present techniques propose that such "optimisation" steps may be a trigger to include the source address associated with the taken branch instruction in the trace stream, i.e. to respond to the "optimisation" steps by determining that the current status condition of the apparatus is not met. Thus in some embodiments the trace generating circuitry is responsive to an indication that the data processing circuitry has removed at least one branch instruction from the sequence of instructions in a performance improvement procedure to determine that the current status condition of the apparatus is not met.

At least some embodiments provide a method of operating an apparatus comprising:

performing data processing operations in response to a sequence of instructions, wherein the sequence of instructions comprises branch instructions;

generating a trace stream of trace items indicative of the data processing operations, wherein when one or more not-taken branch instructions are followed by a taken branch instruction in the sequence of instructions the generating a trace stream of trace items indicative of the data processing operations comprises:

including at least one not-taken trace item corresponding to the one or more not-taken branch instructions followed by a taken trace item in the trace stream when a current status condition of the apparatus is met; and including a source address associated with the taken branch instruction in the trace stream a current status condition of the apparatus when the current status condition of the apparatus is not met.

At least some embodiments provide an apparatus comprising:

means for performing data processing operations in response to a sequence of instructions, wherein the sequence of instructions comprises branch instructions;

means for generating a trace stream of trace items indicative of the data processing operations, wherein when one or more not-taken branch instructions are followed by a taken branch instruction in the sequence of instructions the means for generating activates:

means for including at least one not-taken trace item corresponding to the one or more not-taken branch instructions followed by a taken trace item in the trace stream when a current status condition of the apparatus is met; and means for including a source address associated with the taken branch instruction in the trace stream when the current status condition of the apparatus is not met.

Some particular embodiments are now described with reference to the figures.

FIG. 1 schematically illustrates an apparatus 10 in one example embodiment. The apparatus comprises data processing circuitry 12 and trace generation circuitry 14. The data processing circuitry 12 performs data processing operations in response to a sequence of instructions which comprises branch instructions. The trace generation circuitry 14 receives data processing information which is indicative of the data processing operations which the data processing circuitry 12 carries out and based thereon it generates trace items (elements) which form a trace stream, from which the activity of the apparatus can be reconstructed. In particular the data processing operations performed by the data processing circuitry 12 in response to the sequence of instructions can be reconstructed. As will be discussed in more detail below with respect to the figures which follow, the manner in which the trace generation circuitry 14 generates the trace stream is dependent on a current status condition 16 of the apparatus 12. This current status condition 16 may take a number of forms, as specifically discussed with reference to the figures which follow. Moreover the manner in which the trace generation circuitry generates trace items indicative of branch instructions in the sequence of instructions (and how the data processing circuitry 12 responded to those branch instructions) is dependent on the current status condition. When the current status condition is met, the trace generation circuitry 14 may include not-taken and taken trace items (indicative of not-taken and taken branches respectively) in the trace stream, whilst when the current status condition is not met, the trace generation circuitry 14 may include a source address of a branch instruction when that branch is taken. If the branch was an indirect branch the taken trace item further comprises an indication of a target address for the branch.

Figure 2:
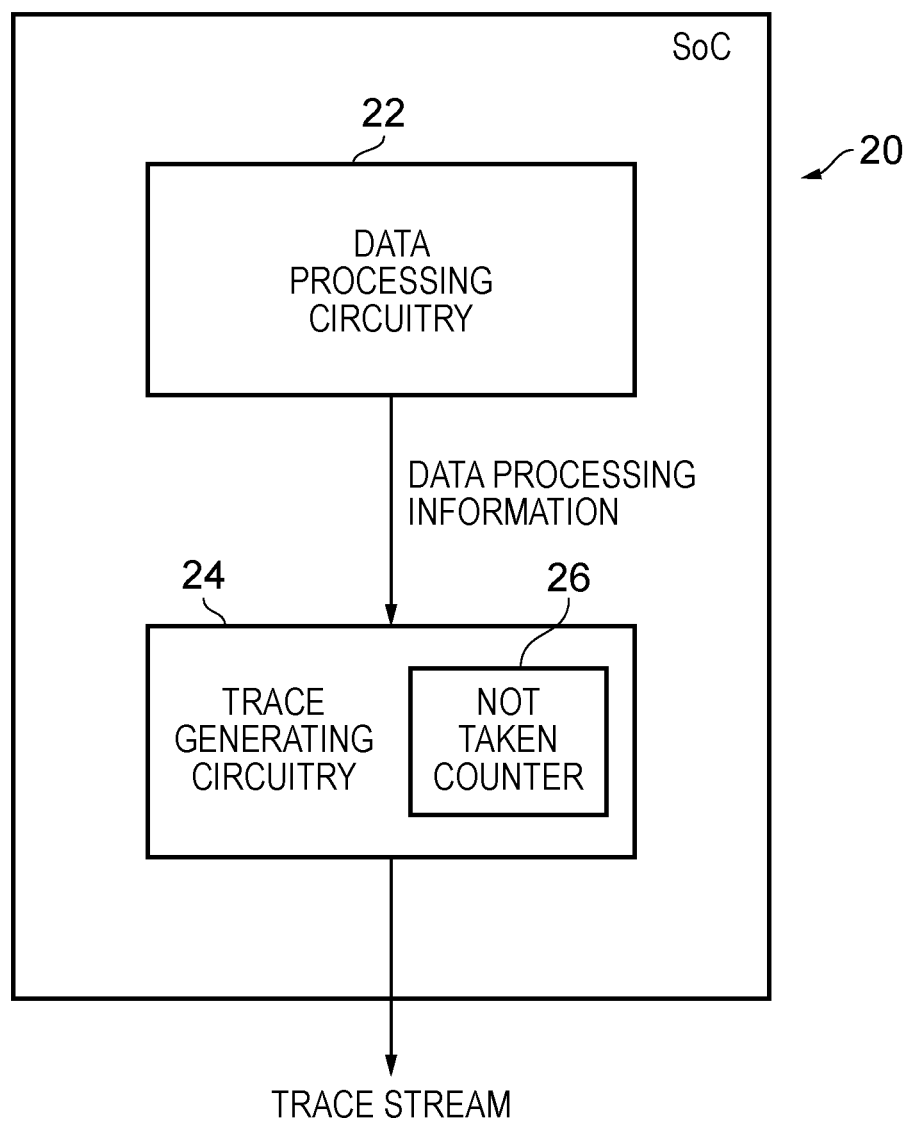
FIG. 2 schematically illustrates a system-on-chip apparatus in one example embodiment.

FIG. 2 schematically illustrates an apparatus 20 in one example embodiment. The apparatus 20 is embodied as a system-on-chip (SoC) device and comprises data processing circuitry 22 and trace generation circuitry 24. The data processing circuitry 22 performs data processing operations in response to a sequence of instructions which comprises branch instructions. The trace generation circuitry 24 receives data processing information which is indicative of the data processing operations which the data processing circuitry 22 carries out and based thereon it generates trace items (elements) which form a trace stream, from which the activity of the apparatus can be reconstructed. As described for the apparatus 10 of FIG. 1, the manner in which the trace generation circuitry 24 generates the trace stream is dependent on a current status condition of the apparatus 20. In FIG. 2 a key component of that current status condition is represented by the not-taken counter 26. This not-taken counter 26 is incremented when the data processing circuitry 22 encounters a branch instruction in the sequence of instructions, and the branch is not taken. Hence, the manner in which the trace generation circuitry 24 generates trace items indicative of branch instructions in the sequence of instructions (and how the data processing circuitry 22 responded to those branch instructions) is dependent on the current value of the not-taken counter 26. Thus for certain values of the not-taken counter 26 the current status condition is determined to be met and the trace generation circuitry 24 may include not-taken and taken trace items (indicative of not-taken and taken branches respectively) in the trace stream, whilst for other values of the not-taken counter 26 the current status condition is determined not to be met and the trace generation circuitry 24 may include a source address of a branch instruction when that branch is taken.

Figure 3:
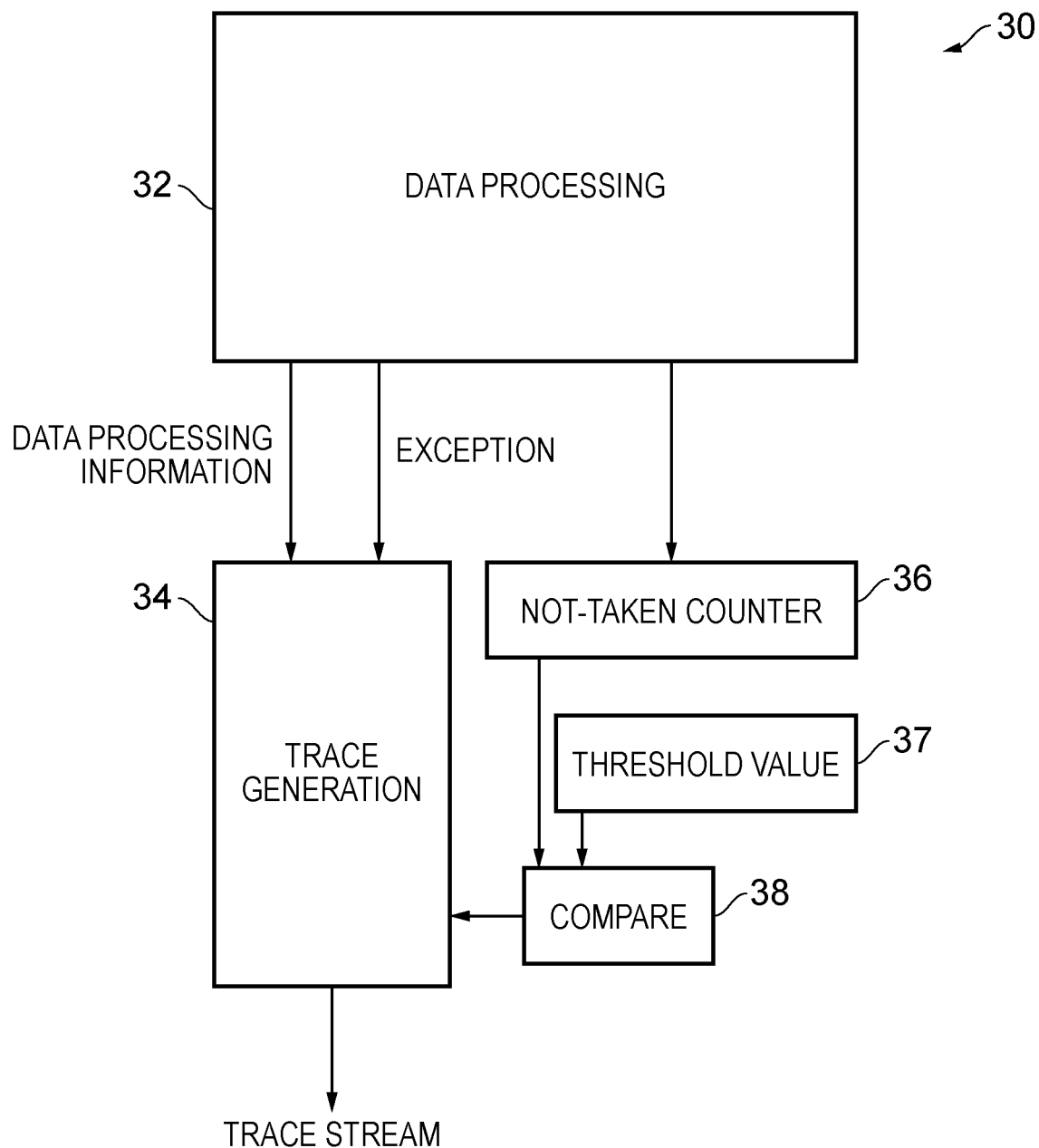
FIG. 3 schematically illustrates an apparatus in one example embodiment.

FIG. 3 schematically illustrates an apparatus 30 in one example embodiment. The apparatus comprises data processing circuitry 32 and trace generation circuitry 34. The data processing circuitry 32 performs data processing operations in response to a sequence of instructions which comprises branch instructions. The trace generation circuitry 34 receives data processing information which is indicative of the data processing operations which the data processing circuitry 32 carries out and based thereon it generates trace items (elements) which form a trace stream, from which the activity of the apparatus can be reconstructed. The apparatus 32 also comprises not-taken counter 36, threshold value storage 37 and comparison circuitry 38. As for the not-taken counter 26 in FIG. 2, the not-taken counter 36 is incremented when the data processing circuitry 32 encounters a branch instruction in the sequence of instructions, and the branch is not taken. The provision of the threshold value storage 37 and comparison circuitry 38 enables a determination to be made of whether the current status condition is met or not. Specifically, the current status condition is determined to be met when the value of the not-taken counter 36 is less than the threshold value 37, and the current status condition is determined not to be met when the value of the not-taken counter 36 is not less than the threshold value 37. On this basis the trace generation circuitry 34 may include not-taken and taken trace items (indicative of not-taken and taken branches respectively) in the trace stream or may include a source address of a branch instruction when that branch is taken.

It should be noted that the embodiments of FIGS. 1-3 not to be viewed as distinct embodiments which are mutually exclusive in any way, but rather are merely presented in Figures in order to emphasise different aspects of the present techniques and different possibilities for their embodiment. For example the current status condition 16 is shown in FIG. 1 as forming part of the data processing circuitry 12, whilst the not-taken counter 26 in shown in FIG. 2 as forming part of the trace generating circuitry 24, and the not-taken counter 36, threshold value storage 37 and comparison circuitry 38 in FIG. 3 are shown outside the data processing circuitry 32 and the trace generating circuitry 34. This therefore highlights that there are a range of ways in which the present techniques could be embodied, and notably there is no need for items such as a current status condition, a not-taken counter, a threshold value, or comparison circuitry to form part of one or the other (or indeed either) of data processing circuitry or of trace generating circuitry. This observation also applies freely to FIGS. 4A and 4B which follow, both with respect to one another and with respect to FIGS. 1-3. Elements may be freely combined from each as appropriate.

Figure 4A:
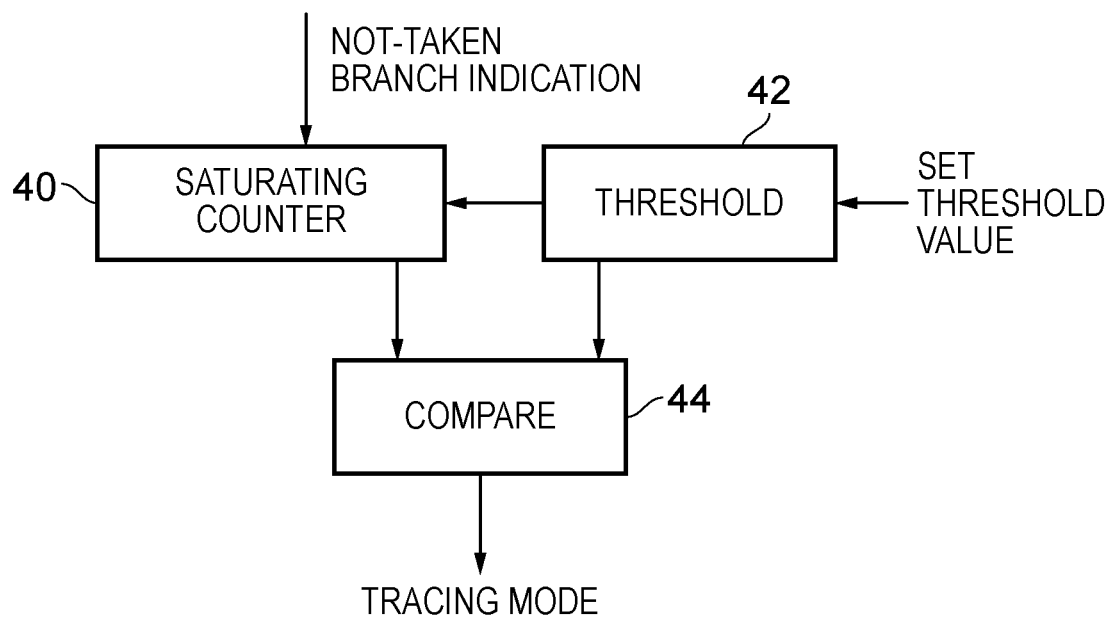
FIG. 4A schematically illustrates some components of an apparatus in one example embodiment.

FIG. 4A schematically illustrates saturating not-taken counter 40, threshold value storage 42, and comparison circuitry 44. As for the not-taken counter 26 in FIG. 2 and the not-taken counter 36 in FIG. 3, the not-taken counter 40 is incremented when the monitored data processing circuitry (not shown in FIG. 4A) encounters a branch instruction in the sequence of instructions, and the branch is not taken. The not-taken counter 40 is a saturating counter, arranged to saturate at (i.e. not increment further than) a saturation value, even if further not-taken branches are encountered. This saturation value is defined by the threshold value 42, which itself may be configurable (see input "set threshold value"). The comparison circuitry 44 compares the current value of the not-taken counter 40 and the threshold value 42 to determine whether the current status condition is met or not. Specifically, the current status condition is determined to be met when the value of the saturating not-taken counter 40 is less than the threshold value 42 (i.e. the counter 40 has not yet saturated), and the current status condition is determined not to be met when the value of the not-taken counter 40 is not less than the threshold value 42 (i.e. the counter 40 has saturated). The current status condition determines the "tracing mode", i.e. whether trace generation circuitry (not shown in FIG. 4A) includes not-taken and taken trace items (indicative of not-taken and taken branches respectively) in the trace stream or includes a source address of a branch instruction when a branch is taken.

Figure 4B:
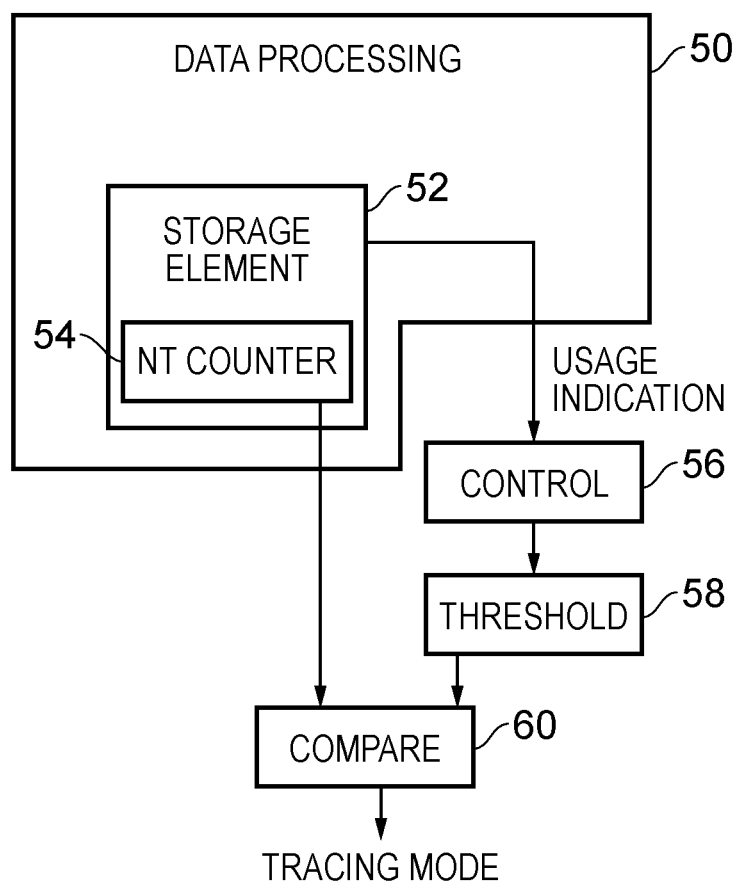
FIG. 4B schematically illustrates some components of an apparatus in one example embodiment.

FIG. 4B shows a further example of data processing circuitry 50, which is shown to comprise a storage element 52. This storage element may be variously embodied, such as by a register or by a cache data store, as its particular form is not of significance here. Note however that the storage element is used at least in part to maintain the not-taken (NT) counter 54. As in the above examples the not-taken (NT) counter 54 is incremented when the data processing circuitry 50 encounters a branch instruction in the sequence of instructions and the branch is not taken. The apparatus also comprises threshold value storage 58 and comparison circuitry 60. As described above a comparison of the NT counter 54 value and the threshold value 58 by the comparison circuitry 60 determines the "tracing mode". Note however that control circuitry 56 is also present. This control circuitry 56 receives a usage indication from the storage element 52 and on this basis controls the setting of the threshold value 58. For example this usage indication may be a current occupancy of the storage element 52. This facility is provided such that when the capacity of the storage element 52 is in greater demand (by other system requirements) the threshold can be lowered, meaning that less of the storage element 52 is required to provide the NT counter 54. When the capacity of the storage element 52 is in lesser demand by other system requirements the threshold can be raised, allowing more of the storage element 52 to be used as the NT counter 54. The threshold value 58 can be freely set in this way, and may even be reduced to zero. Different behaviours in response to differently set threshold values are discussed in more detail below.

FIG. 5A shows on the left an instruction sequence comprising only branch instructions. Non-branch instructions could (and would likely) be interleaved between the shown branch instructions but are not of relevance to the present discussion and are therefore omitted merely for clarity of illustration. Three exemplary types of branch instruction are shown: B (branch); BNE (branch-not-equal); and BEQ (branch-equal). Some are labelled as being (in this example execution sequence) taken; the remainder are not-taken. On the right of the figure is the resulting trace stream. In this example a threshold value of three was set for the not-taken counter. As a result, the first taken branch causes an "E" (executed) atom to be output. The next two not-taken branches each cause an "N" (not-executed) atom to be output. The next taken branch also causes an "E" atom to be output. However the following sequence of four not-taken branches exceeds the threshold value of three set for the not-taken counter and as a result no "N" atoms are output, but rather the next taken branch causes the source address for the corresponding branch instruction to explicitly be traced (output).

FIG. 5B shows a further example instruction sequence of four instructions forming a typical coding loop. Further, in this example the loop is iterated many times before the program flow exits the loop, with the BNE instructions #2 and #3 repeatedly not being taken and the BEQ instruction #4 repeatedly being taken. A contemporary (speculative) processor will therefore commonly optimise the execution of this particular code sequence, effectively transforming it into the truncated code sequence shown in the lower part of FIG. 5B, i.e. only the compare CMP #1 and the BEQ #4. For an apparatus which is configured to perform this kind of "optimisation" (removing the BNEs), this action can also be used as a trigger to change the tracing mode, i.e. to force the output of the Source Address, even though the count of 2 N atoms is below the currently defined threshold (of, say, three).

FIG. 5C shows another example code sequence, showing two possibilities for the tracing of the final BEQ #5, these being either only to trace its source address (with the fact that it was "taken" being implicit), or to trace first the source address, followed by an explicit "E" atom. In other words, in the "A" example the presence of the Source Address in the trace stream implies that the final branch was taken, and in the "B" example the presence of the Source address in the trace stream implies nothing about the final branch, and the E atom explicitly indicates that the branch was taken.

Figure 6A:
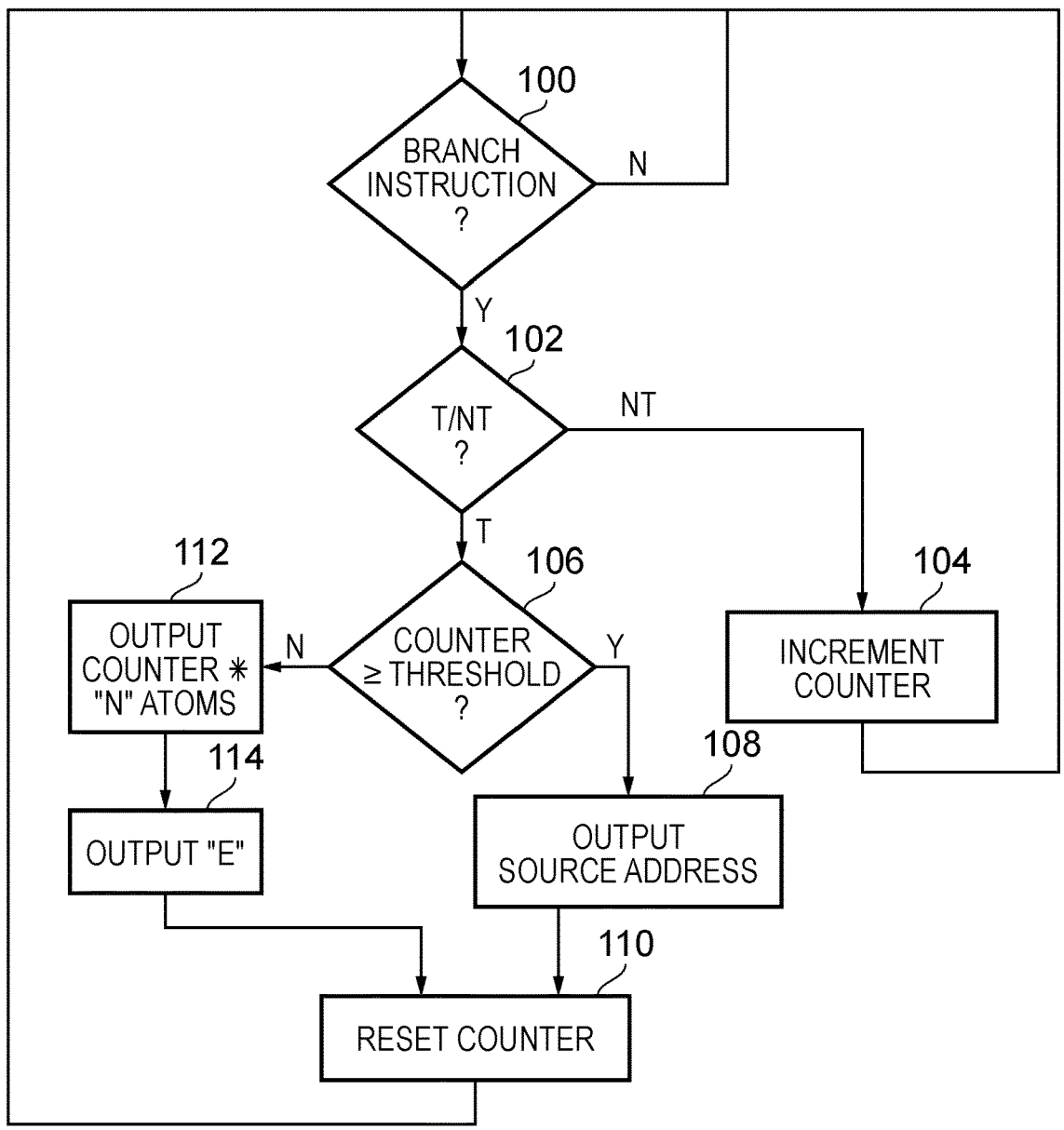
FIG. 6A is a flow diagram showing a sequence of steps which are taken in one example embodiment and FIG. 6B shows a variant on FIG. 6A.

FIG. 6A is a flow-diagram which shows a sequence of steps which are taken in one example method. The flow can be considered to start at step 100 where, for each instruction with the data processing circuitry encounters, it is determined the instruction is a branch instruction. The flow loops on itself at step 100 for other types of instruction. However when a branch instruction is encountered at step 102 it is determined if the branch is taken or not-taken. For not-taken branches, at step 104, a not-taken counter is incremented (noting that it may, if so embodied, saturate) and the flow returns to step 100. For taken branches the flow proceeds to step 106, where it is determined if the not-taken counter is at or above the defined threshold (e.g. has saturated). If this condition is true, the flow proceeds to step 108, where the source address of the taken branch is output. Then at step 110 the not-taken counter is reset. If however at step 106 the condition is not true, the flow proceeds to step 112, and the tracing circuitry outputs as many N atoms (not-taken trace items) as the not-taken counter currently indicates. This could therefore be none, one, or as many as the not-taken counter can indicates below its threshold. Then at step 114 an E atom (taken trace item) is output and at step 110 the not-taken counter is reset. From step 110 the flow returns to step 100.

As a final point with respect to step 112 in FIG. 6A, and recalling that the present techniques propose that the threshold value may be variable, note that this then means that there are three categories of behaviour which may be configured by the setting of the threshold value. Firstly, if the threshold value is set to zero, then all taken branches will result in a corresponding source address being traced. Secondly, if the threshold is set to one, then a) if no not-taken branches have been encountered (since the last taken branch) a taken branch will result in an E atom being traced, or b) if any not-taken branches have been encountered (since the last taken branch) a taken branch will result in a corresponding source address being traced. Thirdly, if the threshold is set above one (call it "x" here), then a) if a number (call it "y" here) fewer than "x" not-taken branches have been encountered (since the last taken branch) a taken branch will result in "y" N atoms being output, followed by an E atom, or b) if at least "x" not-taken branches have been encountered (since the last taken branch) a taken branch will result in a corresponding source address being traced.

Figure 6B:
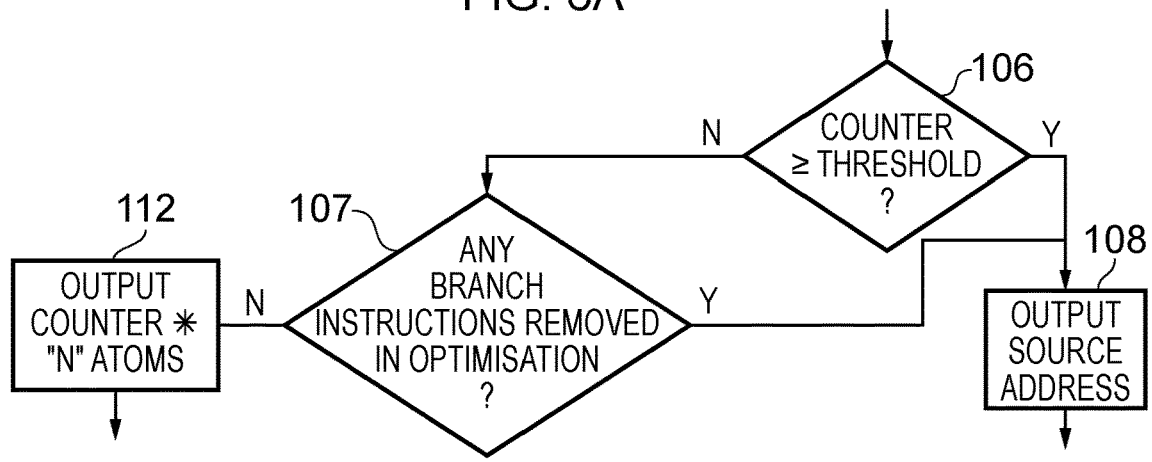

FIG. 6B shows a variant on the flow-diagram of FIG. 6A, which variant is an identical flow to that of FIG. 6A, with only the addition of determination step 107 between steps 106 and 112. Thus from step 106 if the condition is not true, an additional determination is made at step 107 to test if an indication has been received that branch instructions (in the current sequence of instructions) have been removed in an "optimisation" (performance improvement) procedure (when it is determined that these branches are (currently) rarely taken. If this is not true, then the flow proceeds to step 112, and the tracing circuitry outputs as many N atoms (not-taken trace items) as the not-taken counter currently indicates. If however this is true, then the flow proceeds to step 108, where the source address of the taken branch is output.

Figure 7:
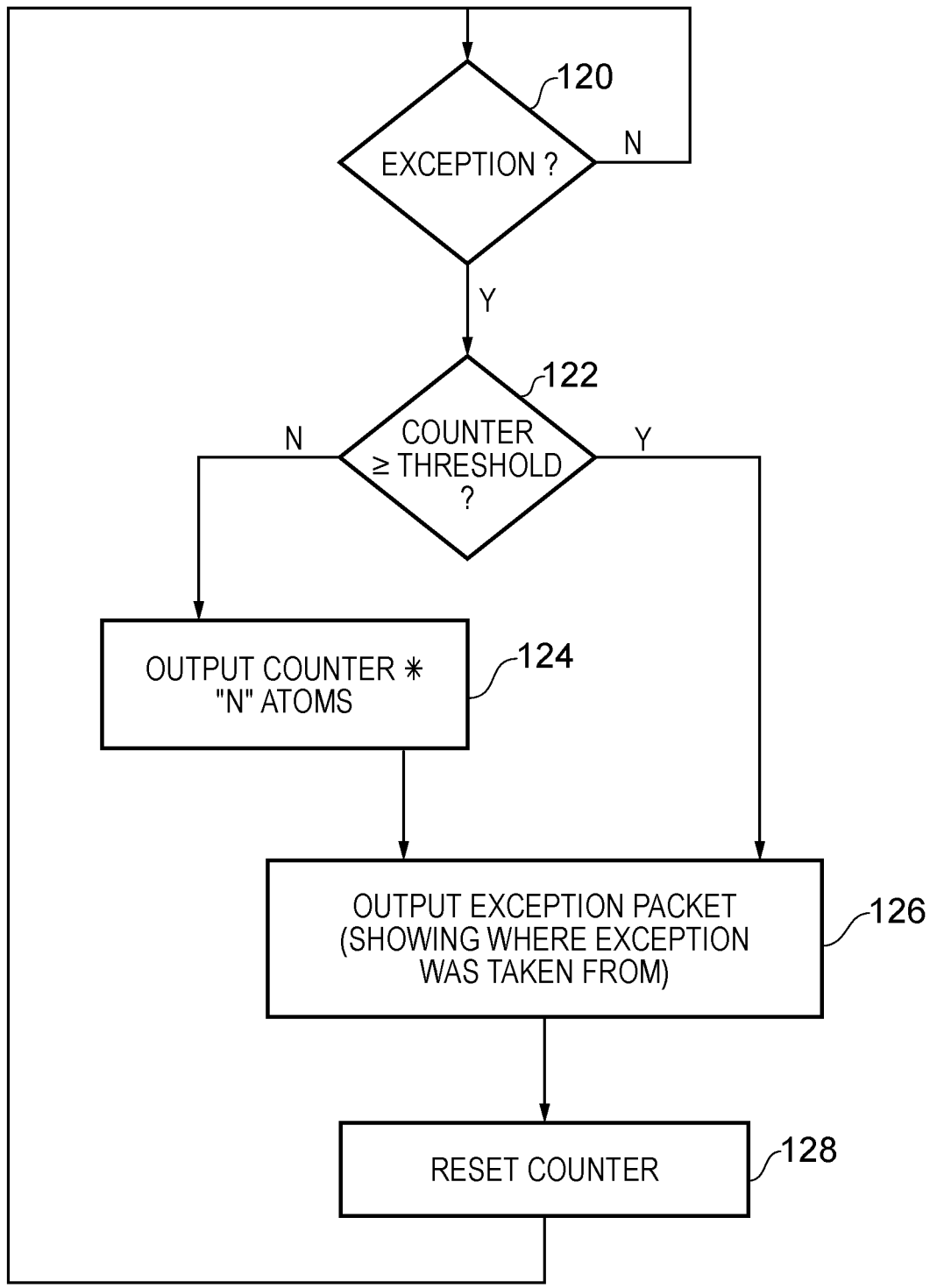
FIGS. 7 and 8 are flow diagrams each showing a sequence of steps which are taken to handle exceptions in one example embodiment.
Figure 8:
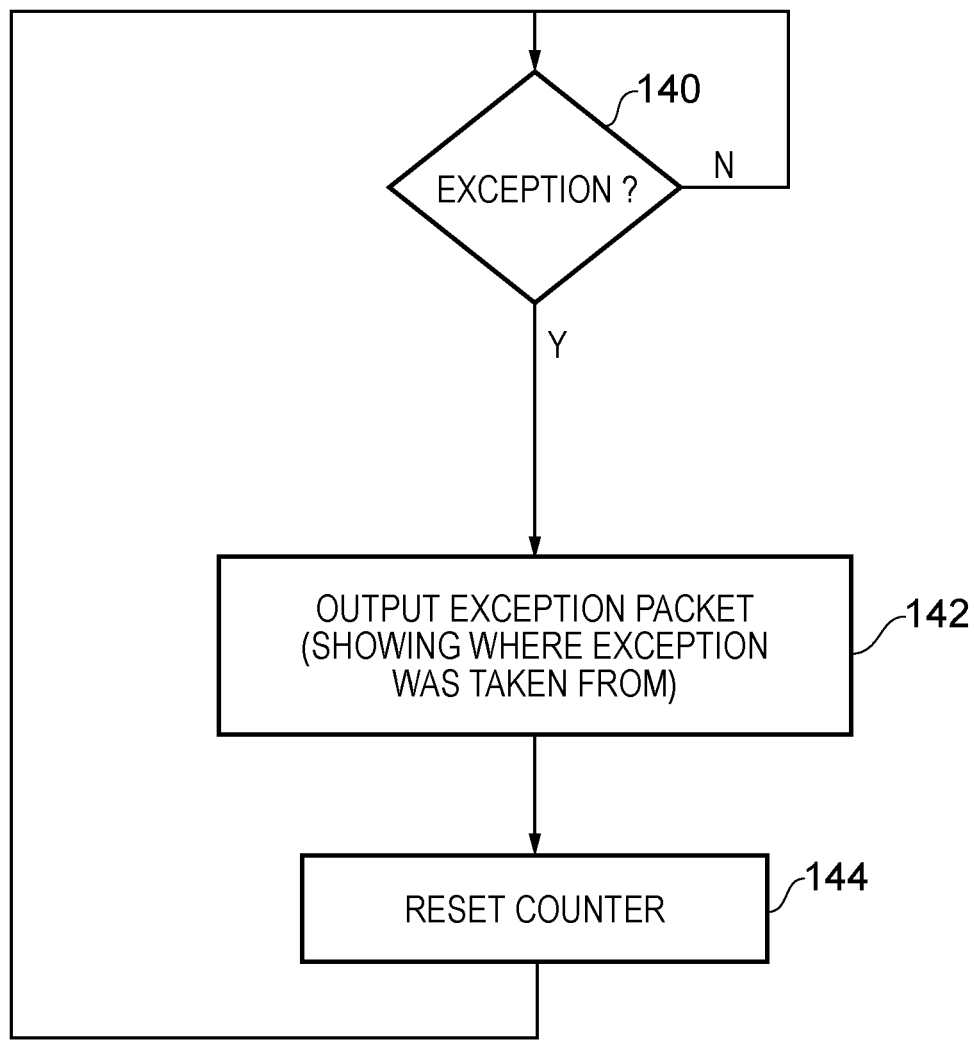

FIGS. 7 and 8 are flow-diagrams which show sequences of steps which are taken in two example methods with respect to the handling of exceptions. It is important to note that FIGS. 7 and 8 should therefore be understood to be processes which may each run in parallel to, for example, the method steps shown in FIGS. 6A (and 6B). In other words, FIGS. 6A (and 6B) show examples of how branch instructions may be traced by the present techniques and in parallel to this each of FIGS. 7 and 8 show examples of how exceptions may be handled when implementing the present techniques. Moreover these exception handling techniques may be implemented in any of the example apparatus embodiments shown in FIGS. 1-4, and merely by way of example, an exception signal is shown in FIG. 3 passing from the data processing circuitry 32 to the trace generation circuitry 34.

In FIG. 7 the flow can be considered to begin at step 120, where it is determined if an exception has occurred. If it has not the flow loops back on itself, waiting at this step. When an exception does occur (which effectively causes a branch to some other code) then the flow proceeds to step 122, where it is determined if the not-taken counter is at or above the defined threshold (e.g. has saturated). If this is not true, then the trace generator outputs as many N atoms (not-taken trace items) as the not-taken counter currently indicates (i.e. outputs COUNTER*N-atoms). Then at step 126 an exception packet is output which indicates where the exception was taken from (which must be done, because the exception might not have occurred on a branch instruction). If however at step 122 it is found that the not-taken counter is at or above the defined threshold (e.g. has saturated), then the flow proceeds directly to step 126, and just the exception packet indicating where the exception was taken from is output. This implies that any branch instructions were not-taken, just like a Source Address trace item in the examples of FIGS. 6A and 6B. Finally at step 128 the not-taken counter is reset and the flow returns to step 120.

FIG. 8 shows an alternative approach to exception handling to that shown in FIG. 7. Here, in all circumstances only an exception packet indicating where the exception was taken from is output. In terms of the use of a "current status condition" described herein, the exception causes the current status condition to not be met. In FIG. 8 the flow can be considered to begin at step 140, where it is determined if an exception has occurred. If it has not the flow loops back on itself, waiting at this step. When an exception does occur (which effectively causes a branch to some other code) then the flow proceeds to step 142, where an exception packet is output which indicates where the exception was taken from (which must be done, because the exception might not have occurred on a branch instruction). Finally at step 144 the not-taken counter is reset and the flow returns to step 144.

In brief overall summary an apparatus comprises data processing circuitry to perform data processing operations in response to a sequence of instructions, where the sequence of instructions comprises branch instructions. Trace generating circuitry generates a trace stream of trace items indicative of the data processing operations. The trace generating circuitry is responsive to one or more not-taken branch instructions followed by a taken branch instruction in the sequence of instructions to: include at least one not-taken trace item corresponding to the one or more not-taken branch instructions followed by a taken trace item in the trace stream when a current status condition of the apparatus is met, and to include a source address associated with the taken branch instruction in the trace stream when the current status condition of the apparatus is not met. A hybrid approach between tracing not-taken branch instructions and tracing a source address associated with the taken branch instruction is thus provided.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:
1. An apparatus comprising:
  data processing circuitry to perform data processing operations in response to a sequence of instructions, wherein the sequence of instructions comprises branch instructions; and
  trace generating circuitry to generate a trace stream of trace items indicative of the data processing operations, wherein the trace generating circuitry is responsive to one or more not-taken branch instructions followed by a taken branch instruction in the sequence of instructions to:
  include at least one not-taken trace item corresponding to the one or more not-taken branch instructions followed by a taken trace item in the trace stream when a current status condition of the apparatus is met; and
  to include a source address associated with the taken branch instruction in the trace stream when the current status condition of the apparatus is not met,
  wherein:
  the current status condition comprises a multiplicity of the one or more not-taken branch instructions being less than a threshold value;
  the apparatus further comprises a not-taken counter responsive to a not-taken branch instruction to increment; and
  the trace generating circuitry is responsive to occurrence of an exception in the data processing circuitry to include in the trace stream an exception trace item indicative of a point in the sequence of instructions at which the exception occurred and to reset the not-taken counter.

2. The apparatus of claim 1, wherein the not-taken counter is a saturating counter arranged to saturate at the threshold value.

3. The apparatus of claim 1, wherein the not-taken counter comprises a one-bit storage element.

4. The apparatus of claim 1, wherein the not-taken counter comprises a multiple-bit storage element.

5. The apparatus of claim 1, wherein the trace generating circuitry is responsive to the taken branch instruction in the sequence of instructions to include as many not-taken trace items in the trace stream as the not-taken counter indicates when the current status condition of the apparatus is met.

6. The apparatus of claim 1, wherein the trace generating circuitry is responsive to occurrence of an exception in the data processing circuitry to include as many not-taken trace items in the trace stream as the not-taken counter indicates.

7. The apparatus of claim 1, wherein the threshold value is a predetermined static value for the apparatus.

8. The apparatus of claim 1, wherein the threshold value is a variable value.

9. The apparatus of claim 8, wherein the trace generating circuitry is responsive to a current resource usage indication for the apparatus to dynamically set the threshold value.

10. The apparatus of claim 9, wherein the current resource usage indication for the apparatus indicates current occupancy of a storage element in the apparatus.

11. The apparatus of claim 1, wherein the current status condition of the apparatus comprises a current occupancy of a storage element in the apparatus.

12. The apparatus of claim 1, wherein the taken trace item is an indication that a branch for the taken branch instruction was taken.

13. The apparatus of claim 1, wherein the taken trace item is the source address associated with the branch instruction.

14. The apparatus of claim 1, wherein the taken trace item is an indication that a branch for the taken branch instruction was taken preceded by the source address associated with the branch instruction.

15. The apparatus of claim 1, wherein the taken trace item further comprises an indication of a target address for the branch, when the branch is an indirect branch.

16. The apparatus of claim 1, wherein the trace generating circuitry is responsive to an indication that the data processing circuitry has removed at least one branch instruction from the sequence of instructions in a performance improvement procedure to determine that the current status condition of the apparatus is not met.

17. A method of operating an apparatus comprising:
performing, with data processing circuitry, data processing operations in response to a sequence of instructions, wherein the sequence of instructions comprises branch instructions;
generating a trace stream of trace items indicative of the data processing operations,
wherein when one or more not-taken branch instructions are followed by a taken branch instruction in the sequence of instructions the generating a trace stream of trace items indicative of the data processing operations comprises:
including at least one not-taken trace item corresponding to the one or more not-taken branch instructions followed by a taken trace item in the trace stream when a current status condition of the apparatus is met;
including a source address associated with the taken branch instruction in the trace stream a current status condition of the apparatus when the current status condition of the apparatus is not met, wherein the current status condition comprises a multiplicity of the one or more not-taken branch instructions being less than a threshold value;
incrementing a not-taken counter in response to a not-taken branch instruction; and
including in the trace stream, in response to occurrence of an exception in the data processing circuitry, an exception trace item indicative of a point in the sequence of instructions at which the exception occurred and to reset the not-taken counter.

\* \* \* \* \*